United States Patent
Hibner et al.

(10) Patent No.: US 7,684,913 B2
(45) Date of Patent: Mar. 23, 2010

(54) SYSTEM AND METHOD FOR ADJUSTING A ZERO POINT OF A SEAT LOAD SENSING SYSTEM

(75) Inventors: Christopher Hibner, Canton, MI (US);
Raymond J. David, Dearborn, MI (US);
Nick L. Smith, Southfield, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1364 days.

(21) Appl. No.: 11/041,820

(22) Filed: Jan. 24, 2005

(65) Prior Publication Data

US 2006/0167604 A1    Jul. 27, 2006

(51) Int. Cl.
*G06F 17/00* (2006.01)

(52) U.S. Cl. ......................................... 701/45; 280/735

(58) Field of Classification Search ................... 701/36, 701/45–47; 280/734–736; 331/2; 307/9.1, 307/10.1, 1.6, 10.7; 340/665–668
See application file for complete search history.

(56) References Cited

U.S. PATENT DOCUMENTS

| | | | |
|---|---|---|---|
| 6,479,766 B2 | 11/2002 | Gray et al. | |
| 6,502,048 B1 | 12/2002 | Lichtinger et al. | |
| 6,557,424 B1 | 5/2003 | Morell | |
| 6,571,647 B1 | 6/2003 | Aoki et al. | |
| 6,609,054 B2 | 8/2003 | Wallace | |
| 6,640,175 B2 | 10/2003 | Vos et al. | |
| 6,643,575 B2 * | 11/2003 | Ishida et al. | 701/45 |
| 6,650,978 B1 | 11/2003 | Patterson et al. | |
| 6,677,538 B2 | 1/2004 | Cook, Jr. et al. | |
| 6,725,165 B1 | 4/2004 | Knox et al. | |
| 6,774,319 B2 | 8/2004 | Aoki et al. | |
| 6,871,159 B2 * | 3/2005 | Hattori et al. | 702/173 |
| 7,026,946 B2 * | 4/2006 | Saunders et al. | 340/666 |
| 7,162,342 B2 * | 1/2007 | Ishida | 701/45 |
| 2003/0174063 A1 | 9/2003 | Basir et al. | |
| 2003/0196495 A1 | 10/2003 | Saunders et al. | |
| 2003/0213622 A1 | 11/2003 | Sakai et al. | |
| 2003/0220766 A1 | 11/2003 | Saunders et al. | |
| 2004/0215381 A1 * | 10/2004 | Jitsui et al. | 701/45 |

FOREIGN PATENT DOCUMENTS

EP    0 674 182 A2    9/1995

* cited by examiner

*Primary Examiner*—Richard M. Camby
(74) *Attorney, Agent, or Firm*—Tarolli, Sundheim, Covell & Tummino LLP

(57) ABSTRACT

A method (60) for adjusting the zero point of a vehicle seat weight sensing system (10) includes the step of determining a zero point error (64) of the seat weight sensing system. The method (60) also includes the step of adjusting the zero point error (68) in response to determining that the zero point error was influenced by an object on the vehicle seat.

23 Claims, 3 Drawing Sheets

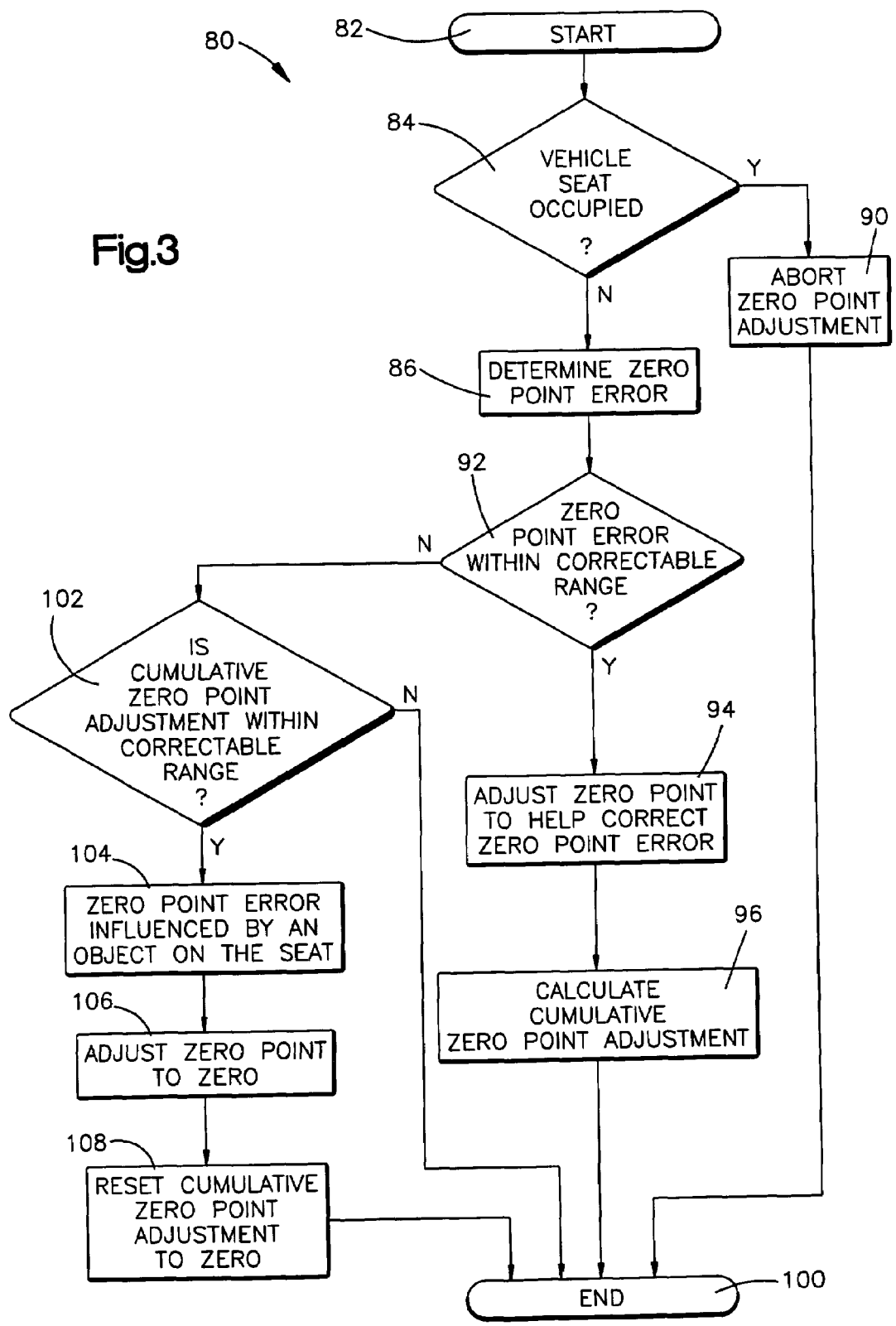

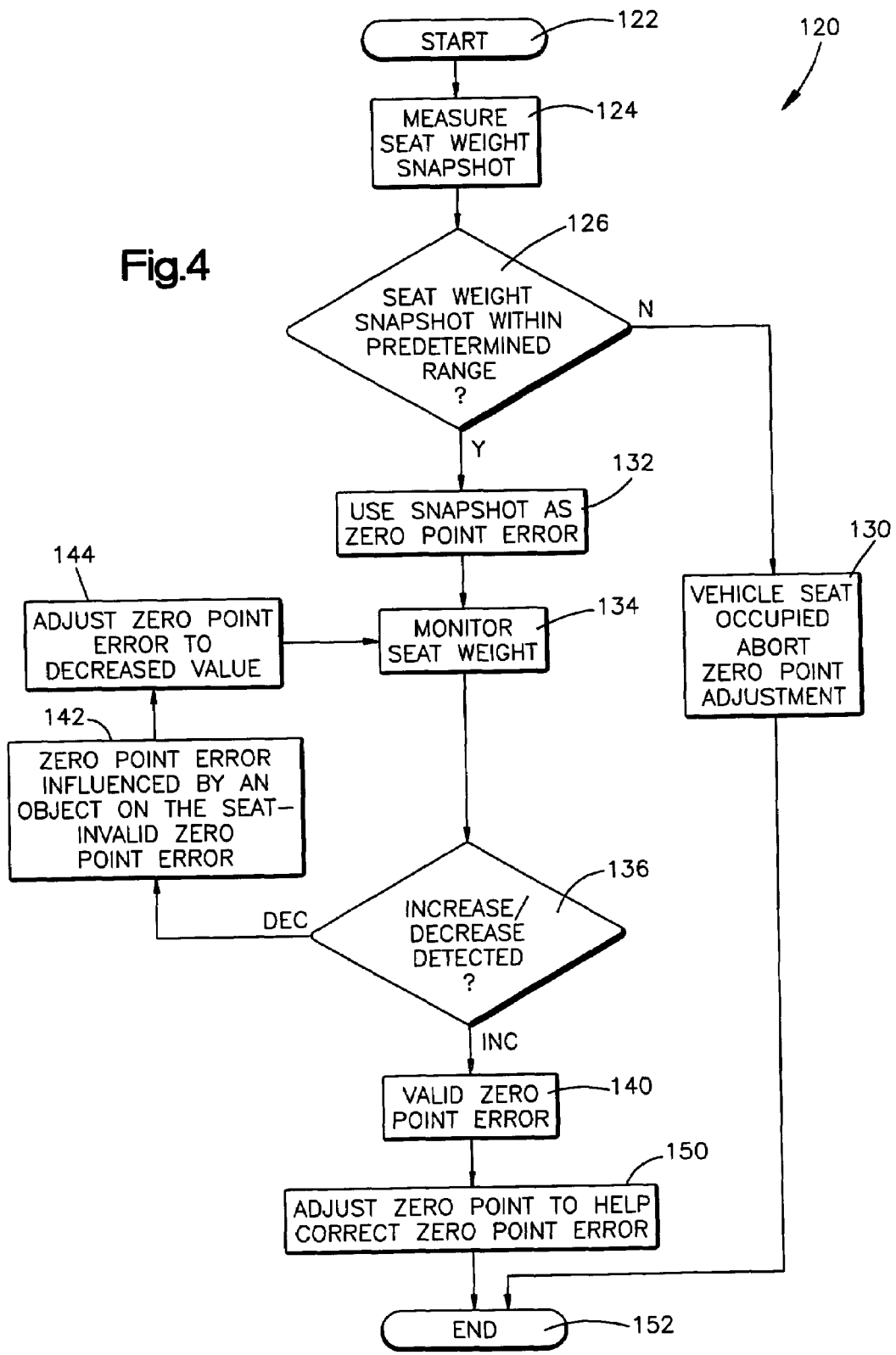

SYSTEM AND METHOD FOR ADJUSTING A ZERO POINT OF A SEAT LOAD SENSING SYSTEM

TECHNICAL FIELD

The present invention relates to a system for sensing a load on a vehicle seat and, more particularly, to a system and method for adjusting a zero point of the seat load sensing system.

BACKGROUND OF THE INVENTION

It is known to disable a vehicle occupant protection device, such as an air bag for an occupant of a vehicle seat, if it is determined that an occupant of the seat is under a certain weight. There are various known seat weight sensing systems that determine the weight or load on the vehicle seat. These known seat weight sensing systems typically include weight sensors that are mounted on the vehicle seat. It is also known to distinguish between the weight of an adult seated in the seat, of a child seated in the seat, and of a child seat cinched down tight in the vehicle seat and to permit, inhibit, or tailor actuation of the protection device in response thereto.

The "zero point" of a seat weight sensing system relates to the weight sensed by the system when there is no load on the seat. The seat weight sensor of the seat weight sensing system has a zero load output when there is no load on the seat. The seat weight sensing system is calibrated to associate a weight of zero with this zero load output. Over time, the zero load output of the seat weight sensor may vary due to factors, such as drift in the seat weight sensor, fatigue in the seat, or fatigue in other vehicle structures. As a result, the seat weight sensing system may read a non-zero weight when there is no load on the seat. This is referred to as a zero point error.

It is known to adjust a zero point in a seat weight sensing system to compensate for a zero point error that falls within a predetermined range. For example, the predetermined range may be −4 kg to +4 kg. In one known method, the system detects a zero point error when sensed conditions indicate that the seat is likely to be unloaded. For example, the system may detect an unloaded seat if the following conditions are satisfied: the sensed weight is within the small range (e.g., −4 kg to +4 kg), the seatbelt is unlatched, the vehicle ignition has remained un-actuated for a predetermined period of time, and there have been no weight fluctuations for a predetermined period of time (e.g., 15 minutes). If a zero point error is detected, the system adjusts the zero point of the system to help correct the error. This can be done by adjusting the zero point to correct the entire error, a portion (e.g., half) of the error, or a portion of the error up to a maximum value (e.g., up to 1 kg).

A problem may occur where the seat weight sensor has a negative zero point error within the predetermined range and an object having a weight outside the correctable range is placed on the seat. For example, if a zero point error causes the system to sense −1.5 kg and a 5 kg object, such as a briefcase, is placed on the seat, the sensed weight would go positive to +3.5 kg, which is within the correctable range. If the object is left on the seat for an extended period, the system may, over time, correct the zero point with the object on the seat. When the object is removed, the sensor would read negative (−5 kg), which is outside the correctable range. This may result in no subsequent zero-point adjustments taking place.

SUMMARY OF THE INVENTION

In accordance with the present invention, a method for adjusting the zero point of a vehicle seat weight sensing system includes the step of determining a zero point error of the seat weight sensing system. The method also includes the step of adjusting the zero point error in response to determining that the zero point error was influenced by an object on the vehicle seat.

Also, in accordance with the present invention, a method for adjusting the zero point of a vehicle seat weight sensing system includes the step of determining an unoccupied condition of the vehicle seat. The method also includes the step of determining a zero point error in response to determining the unoccupied condition. The method further includes the step of determining the zero point error was influenced by an object on the vehicle seat if the zero point error is outside a predetermined range and a cumulative zero point adjustment value is within the predetermined range.

Also, in accordance with the present invention, a method for adjusting the zero point of a vehicle seat weight sensing system includes the step of determining a vehicle seat weight snapshot upon the occurrence of a predetermined vehicle event. The method also includes the step of using the seat weight snapshot as a zero point error of the seat weight sensing system. The method further includes the step of determining the zero point error is invalid in response to determining a decrease in sensed seat weight subsequent to taking the seat weight snapshot.

Also, in accordance with the present invention, a method for adjusting the zero point of a vehicle seat weight sensing system includes the step of determining a vehicle seat weight snapshot upon the occurrence of a predetermined vehicle event. The method also includes the step of using the seat weight snapshot as a zero point error of the seat weight sensing system. The method further includes the step of determining the zero point error is valid in response to determining an increase in sensed seat weight subsequent to taking the seat weight snapshot.

Further, in accordance with the present invention, a vehicle seat weight sensing system includes a seat weight sensor associated with a vehicle seat. The system also includes a controller operative to determine a sensed weight on the vehicle seat in response to an output from the seat weight sensor. The controller includes means for determining a zero point error of the seat weight sensing system. The controller also includes means for adjusting the zero point of the seat weight sensing system in response to determining that the zero point error was influenced by an object on the vehicle seat.

BRIEF DESCRIPTION OF THE DRAWINGS

The foregoing and other features and advantages of the invention will become apparent to one skilled in the art upon consideration of the following description of an exemplary embodiment of the invention and the accompanying drawings, in which:

FIG. 3 is a flow chart illustrating steps of a process performed by the system of FIG. 1 according to a first embodiment of the invention; and FIG. 4 is a flow chart illustrating steps of a process performed by the system of FIG. 1 according to a second embodiment of the invention.

DESCRIPTION OF EMBODIMENTS

Figure 1:
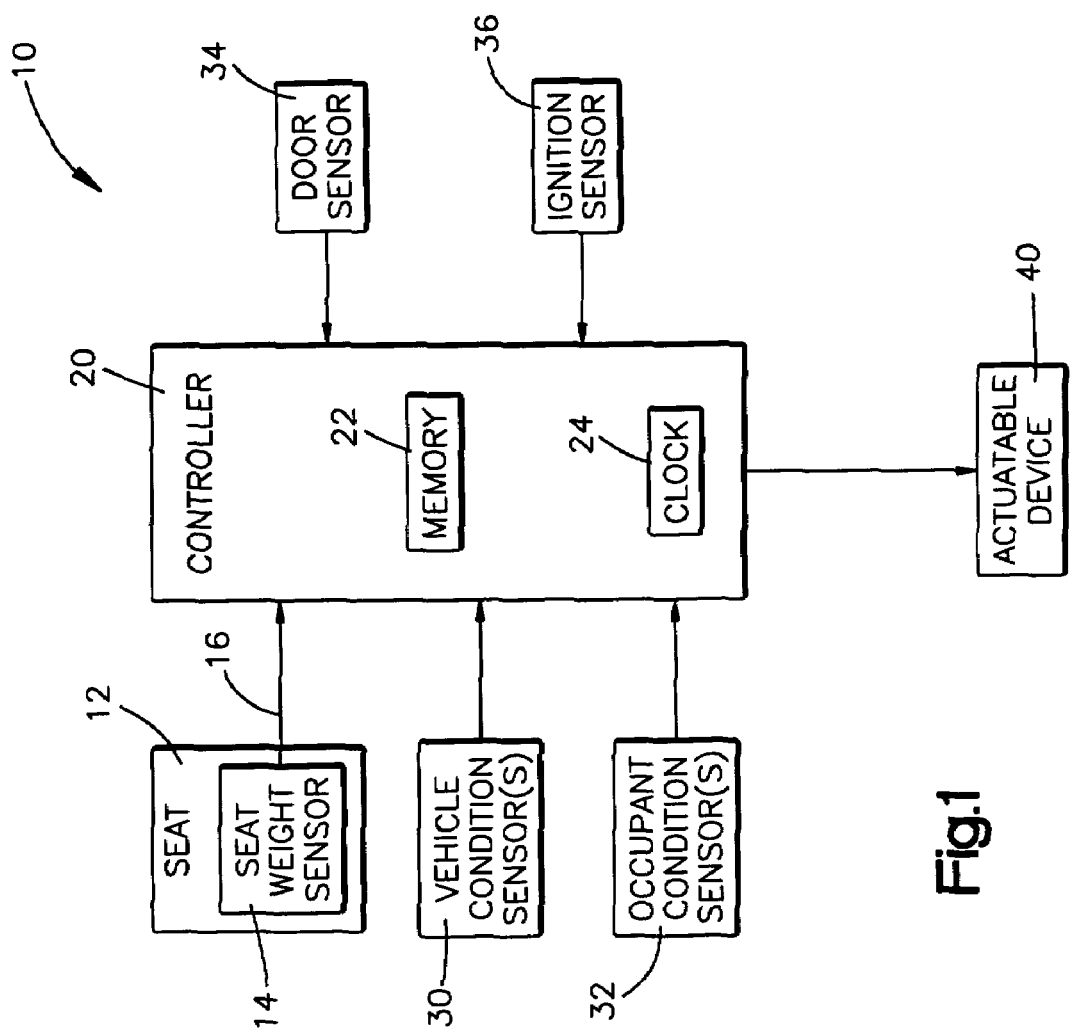
FIG. 1 is a block diagram of a system in accordance with the present invention.

As representative of the present invention, FIG. 1 illustrates a system 10 in accordance with the present invention. The system 10 includes a vehicle seat indicated schematically at 12, such as a front passenger seat of a vehicle (not shown). The system 10 also includes a seat weight sensor 14 that provides an output 16 to a controller 20 via means, such as lead wires. The output 16 of the seat weight sensor 14 is related to the load or weight on the vehicle seat 12.

The seat weight sensor 14 can be any known device used to provide an output related to the load or weight on the vehicle seat 12. For example, the seat weight sensor may comprise one or more strain gauges, pressure pattern sensors, or pressure bladders. In one embodiment, the seat weight sensor 14 comprises strain gauges arranged in a Wheatstone bridge on a load bearing member of a seat frame structure. The seat weight sensor 14 may be responsive to loads or weight on the seat 12 over a large range, with relatively high sensitivity. For example, the seat weight sensor 14 may be responsive to loads or weights up to 100 kilograms or more with a one-tenth kilogram (0.10 kg) sensitivity.

The system 10 may also include one or more vehicle condition sensors 30 that are operative to provide outputs related to sensed vehicle conditions. For example, the vehicle condition sensors 30 may include vehicle crash and/or rollover sensors in which the outputs are related to the occurrence of vehicle events, such as a vehicle collision and/or a vehicle rollover.

The system 10 may also include one or more occupant condition sensors 32 that are operative to provide to the controller 20 outputs related to sensed occupant conditions. For example, the occupant condition sensors 32 may include a seatbelt latch sensor for which the output is related to the latched condition of a seatbelt of the vehicle seat 12. As another example, the occupant condition sensors 32 may include seat position sensor for which the output is related to the position (e.g., forward/rearward) of the vehicle seat 12.

The system 10 may also include a vehicle door sensor 34 (e.g., a switch) that is operative to provide to the controller 20 an output related to an opened/closed condition of a vehicle door. The system 10 may further include a vehicle ignition sensor 36 that is operative to provide to the controller 20 an output related to an activated/de-activated condition of a vehicle ignition.

The system 10 may also include an actuatable device 40, such as an actuatable device for helping to protect an occupant of the vehicle seat 12. The actuatable devices may, for example, be an inflator for an air bag, an inflator for a side curtain, an actuator for a knee bolster, or an actuator for a seat belt retractor. The actuatable device 40 is actuatable in response to an output 22 from the controller 20.

The controller 20 is operative to control actuation of the actuatable device in response to the respective outputs of the seat weight sensor 14, vehicle condition sensors 30, and occupant condition sensors 32. The controller 20 is operative to actuate the actuatable device 40 in a known manner in response to receiving an output from the vehicle condition sensors 30 indicative of the occurrence of an event for which occupant protection is desired, such as a collision or a rollover. The controller 20 may tailor or inhibit actuation of the actuatable device 40 in response to the outputs from the seat weight sensor 14 and/or occupant condition sensors 32. For example, the controller 20 may inhibit actuation of the actuatable device 40 in response to the outputs of the seat weight sensor 14 indicating a weight on the vehicle seat 12 below a predetermined minimum. As another example, the controller 20 may tailor actuation of the actuatable device 40 in response to the outputs of the seat weight sensor 14 and occupant condition sensor 32 indicating an unbelted occupant in the vehicle seat 12.

The apparatus 10 may also include memory 22, which may be part of the controller 20. The memory 22 is operative to store data, even when the vehicle ignition is turned off, as to whether the actuatable device 40 is enabled or disabled. The apparatus 10 may also include a clock or timer 24, which may be part of the controller 20.

The controller 20 is operative to receive the output 16 of the seat weight sensor 14 and determine a sensed seat weight responsive to the output. The controller 20 is also operative to adjust the zero point of the seat weight sensing system 10 to help correct zero point errors in the system.

Figure 2:
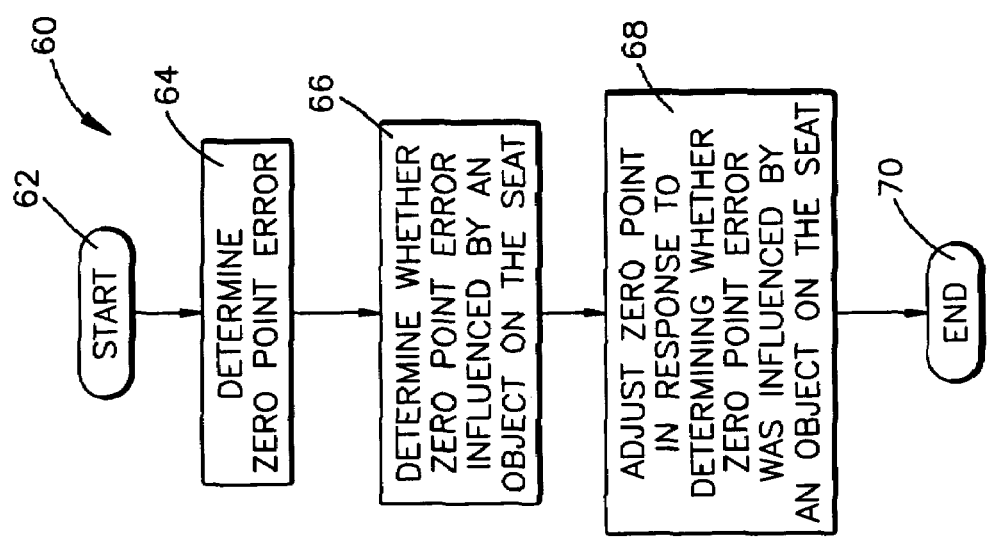
FIG. 2 is a flow chart illustrating steps of a process performed by the system of FIG. 1 according to the invention.

FIG. 2 is a flow diagram illustrating a process or method for performed within the apparatus of FIG. 1. More particularly, the process of FIG. 2 is implemented in the controller 20 and performs adjustments of the zero point of the seat weight sensing system 10 to help correct zero point errors in the system.

The zero point adjustment process 60 begins at step 62 and proceeds to step 64, where a determination is made as to whether there is a zero point error in the seat weight sensing system 10. This may be done, for example, when sensed conditions indicate that the seat 12 is likely to be unloaded, as will be described in further detail below. The process 60 then proceeds to step 66 where a determination is made as to whether the zero point error was influenced by the presence of an object on the vehicle seat 12, as will be described in further detail below. The process 60 then proceeds to step 68, where the zero point of the system 10 is adjusted in response to the determining whether the zero point error was influenced by the presence of an object on the vehicle seat 12. The process 60 then ends at step 70.

FIG. 3 is a flow diagram illustrating a process or method for performed within the apparatus of FIG. 1. More particularly, the process of FIG. 3 details steps for performing the process of FIG. 2. The process of FIG. 3 is implemented in the controller 20 and performs adjustments of the zero point to help correct zero point errors in the seat weight sensing system 10.

The zero point adjustment process 80 begins at step 82 at a predetermined time, such as upon deactivation of the vehicle ignition as indicated by the ignition sensor 36 (FIG. 1) of the system 10. The process 80 proceeds to step 84, where a determination is made as to whether the vehicle seat is occupied, i.e., whether a zero load condition exists. This zero load condition determination may be responsive to a variety of sensed factors. For example, the zero load condition may be determined in response to a predetermined period of time elapsing after the vehicle ignition is deactivated. This time period may, for example, be counted down by the controller 20 via the clock 24 once the ignition sensor 36 indicates the vehicle ignition is deactivated. The time period may be of any desired duration, such as 5-15 minutes or longer.

As another example, the zero load condition may be determined in response to whether the system 10 senses any fluctuation in the weight or load on the vehicle seat 12. For example, small increases or decreases in the sensed seat weight (e.g., 0.2 kg or more) that are maintained for a predetermined period of time may indicate that an object or objects were placed on or removed from the seat 12. If this occurs, the system 10 may determine that a zero load condition of the vehicle seat 12 does not exist and the seat may be considered occupied.

As a further example, the zero load condition may be determined in response to occupant conditions sensed via the occupant condition sensors 32. For example, the occupant condition sensors 32 may include a seat belt latch sensor that indicates whether the seat belt associated with the seat 12 is latched. If the seatbelt is latched, the system 10 may determine that a zero load condition of the vehicle seat 12 does not exist and the seat may be considered occupied.

If, at step 84, a determination is made that the vehicle seat 12 is occupied, i.e., the seat is loaded, the process 80 proceeds to step 90, the zero point adjustment process is aborted, and the process ends at step 100. If, at step 84, a determination is made that the vehicle seat 12 is not occupied, i.e., the seat is unloaded, the process 80 proceeds to step 86, where a determination is made as to whether there is a zero point error in the seat weight sensing system 10. A step 86, the seat weight is measured. If the measured seat weight is non-zero, a zero point error in the seat weight sensing system 10 is indicated.

If it is determined that there is a zero point error is in the system 10, the process 80 proceeds to step 92, where a determination is made as to whether the zero point error is within a correctable range. For example, a correctable range may be −4.0 kg to +4.0 kg. If the zero point error is within the correctable range, the process 80 proceeds to step 94, where the zero point is adjusted to help correct the zero point error in the system 10. This may be done in a variety of manners. For example, the zero point may be adjusted by eliminating or zeroing out the entire zero point error. As another example, the zero point error may be reduced by adjusting the zero point by a predetermined factor, such as by cutting the zero point error in half. As a further example, the zero point may be adjusted by cutting the zero point error by up to a predetermined maximum amount, such as up to 1.0 kg.

Once the zero point is adjusted, the process 80 proceeds to step 96, where a cumulative zero point adjustment is calculated. The cumulative zero point adjustment is calculated as the sum of previous zero point adjustments made at step 94. The cumulative zero point adjustment is stored in the system memory 22 and may be reset to zero, as described below. Once the cumulative zero point adjustment is calculated and stored in memory 22, the process 80 ends, as indicated at step 100.

At step 92, if it is determined that the zero point error is not within the correctable range, the process 80 proceeds to step 102. At step 102, a determination is made as to whether the cumulative zero point adjustment stored in system memory 22 is within the correctable range. If the cumulative zero point adjustment is not within the correctable range, the process 80 proceeds to step 100 and ends.

At step 102, a determination that the cumulative zero point adjustment is within the correctable range indicates that the zero point error was influenced by the presence of an object on the vehicle seat. This determination is made at step 104. In response to this determination, the process 80 proceeds to step 106, where the zero point of the system is adjusted to zero, i.e., zeroed out. The process 80 then proceeds to step 108, where the cumulative zero point adjustment is reset to zero. The process 80 then proceeds to step 100 and ends.

It will be appreciated and understood that the embodiment of the invention described above with reference to FIG. 3 helps address the situation where the system 10 mistakes the presence of an object on the seat 12 as a zero point error. When a zero point error outside the correctable range is detected, the system 10 looks at the cumulative zero point adjustments. If the cumulative zero point adjustments are within the correctable range, this indicates that, until the time of the uncorrectable zero point error, there have been routine zero point errors and corresponding routine adjustments to the zero point. This suddenly large zero point error suggests that there is reason to question whether the zero point error determined at step 86 may have been influenced by an object on the vehicle seat. As a result, according to the embodiment of FIG. 3, the system 10 corrects the unreliable zero point error.

The scenario set forth above may occur, for example, where the system has a small negative error (e.g., due to drift) and an object placed on the seat places the sensed zero load seat weight within the correctable range. For example, if the zero point is at −1.5 kg and a 5.0 kg object, such as a briefcase, is placed on the seat, the sensed zero load weight would go positive to +3.5 kg, which is a zero point error within the correctable range. If the object is left on the seat for an extended period, the system 10 may, over time, correct this perceived zero point error with the object on the seat. When the object is removed, the system 10 would read negative (−5.0 kg) and the system would perceive a zero point error outside the correctable range. According to the embodiment of the present invention illustrated in FIG. 3, if the cumulative zero point adjustment is within the correctable range when this occurs, the zero point error would still be corrected.

FIG. 4 is a flow diagram illustrating a process or method for performed within the apparatus of FIG. 1. More particularly, the process of FIG. 4 details steps for performing the process of FIG. 2. The process of FIG. 4 is implemented in the controller 20 and performs adjustments of the zero point to correct zero point errors in the seat weight sensing system 10.

The zero point adjustment process 120 begins at step 122 and proceeds to step 124, where a snapshot of the measured seat weight is taken. The seat weight snapshot is taken immediately, when the system 10 detects the occurrence of a predetermined startup or wakeup condition. For example, the system 10 may startup or wakeup upon sensing the opening of a vehicle door via the door sensor 34. The system 10 may also startup or wakeup upon sensing a vehicle security event, such as the vehicle locks being unlocked via a remote keyless entry (RKE) system. Once taken, the snapshot seat weight is placed in system memory 22.

Once the seat weight snapshot is taken, the process 120 proceeds to step 126, where a determination is made as to whether the seat weight snapshot is within a predetermined range. This predetermined range may vary. For example, the predetermined range may be 0.0 kg to 12.0 kg. If the seat weight snapshot is not within the predetermined range, an occupied condition of the vehicle seat 12 is indicated. The process 120 proceeds to step 130 and the zero point adjustment is aborted. The process 120 then ends at step 152.

If the seat weight snapshot is within the predetermined range, an unoccupied condition of the vehicle seat 12 is indicated. The process 120 proceeds from step 126 to step 132, where the snapshot seat weight is used as the zero point error of the seat weight sensing system 10. The process 120 then proceeds to step 134, where the system 10 monitors the seat weight on an continual or routine basis. For example, the system 10 may monitor the seat weight at a rate of ten samples per second. If a change is detected in the seat weight, the process proceeds to step 136. There may be a requirement that the change in seat weight remain present for a predetermined period of time, such as for at least 0.5 seconds, in order for the change to be considered reliable and valid.

At step 136, a determination is made as to whether an increase or decrease in the measured seat weight has been detected. If an increase in the measured seat weight is detected, the process 120 proceeds to step 140 and the zero point error determined at step 132 is considered valid. The process 120 then proceeds to step 150, where the zero point of the system 10 is adjusted to help correct the zero point error. The process 120 then ends at step 152.

If, at step 136, a decrease in the measured seat weight is detected, the process 120 proceeds to step 142 where a determination is made that the zero point error determined at step 132 was influenced by an object or load on the vehicle seat 12. The zero point error determined at step 132 is thus considered invalid and the process 120 proceeds to step 144, where the zero point error is adjusted to the decreased value detected at step 136. The process 120 then proceeds to step 134 where the seat weight is monitored for any subsequent increases or decreases and validated or invalidated as described above.

It will be appreciated and understood that the embodiment of the invention described above with reference to FIG. 4 helps address the situation where the system 10 mistakes the presence of an object on the seat 12 as a zero point error. The system 10 determines an unoccupied seat by taking the seat weight snapshot at a time when the seat is likely not to be occupied by a vehicle occupant, i.e., immediately upon the door opening or the vehicle being unlocked via RKE, and using that snapshot initially as the zero point error of the system. This initial zero point error is validated or invalidated by monitoring the load or weight on the seat 12 for a subsequent change. An increase in the sensed seat weight indicates that the initial zero point error was proper. A decrease in the load or weight sensed on the seat 12 suggests that the determination of the zero point error was influenced by the presence of an object on the seat and an adjustment of the zero point error is required.

For example, if there is a 5.0 kg object, such as a briefcase, on the seat 12 when the door sensor 34 indicates the door has been opened, the system 10 will sense a 5.0 kg seat weight. Because this 5.0 kg seat weight is within the predetermined range, the system 10 will identify this weight as a zero point error. The system 10 will continue to monitor the seat weight. If the object is removed, a decrease in seat weight will be sensed, the initial zero point error will be identified as being invalid, and the zero point error of the system 10 will be adjusted.

From the above description of the invention, those skilled in the art will perceive improvements, changes and modifications. Such improvements, changes and modifications within the skill of the art are intended to be covered by the appended claims.

Having described the invention, the following is claimed:

1. A method for adjusting the zero point of a vehicle seat weight sensing system, the method comprising the steps of:
   determining a zero point error of the seat weight sensing system; and
   adjusting the zero point error in response to determining that the zero point error was influenced by an object on the vehicle seat; wherein the step of determining a zero point error comprises the steps of:
   determining an unoccupied condition of the vehicle seat, comprising determining whether a seatbelt is latched;
   determining a sensed weight on the vehicle seat in response to determining the unoccupied condition; and
   determining the zero point error in response to determining the sensed weight.

2. The method of claim 1, wherein said step of determining a sensed weight comprises determining the sensed weight in response to an output of a seat weight sensor associated with the vehicle seat.

3. The method of step 1, further comprising the steps of:
   determining whether the zero point error is within a predetermined range in response to determining that the zero point error was not influenced by an object on the vehicle seat; and
   adjusting the zero point of the seat weight sensing system to help correct the zero point error in response to the zero point error being within the predetermined range.

4. A method for adjusting the zero point of a vehicle seat weight sensing system, the method comprising the steps of:
   determining a zero point error of the seat weight sensing system;
   adjusting the zero point error in response to determining that the zero point error was influenced by an object on the vehicle seat;
   determining an unoccupied condition of the vehicle seat;
   determining a sensed weight on the vehicle seat in response to determining the unoccupied condition; and
   determining the zero point error in response to determining the sensed weight;
   wherein said step of determining an unoccupied condition of the vehicle seat comprises the step of waiting a predetermined time period after the vehicle ignition is deactivated.

5. The method of claim 1, wherein said step of determining an unoccupied condition of the vehicle seat comprises the step of determining whether there are any fluctuations in a sensed seat weight for a predetermined time period.

6. A method for adjusting the zero point of a vehicle seat weight sensing system, the method comprising the steps of:
   determining a zero point error of the seat weight sensing system; and
   adjusting the zero point error in response to determining that the zero point error was influenced by an object on the vehicle seat;
   wherein determining whether the zero point error was influenced by an object on the vehicle seat comprises the steps of:
   determining the zero point error is not within a predetermined range;
   determining a cumulative zero point adjustment value as the sum of previous zero point adjustments; and
   determining the zero point error was influenced by an object on the vehicle seat if the cumulative zero point adjustment value is within the predetermined range.

7. The method of claim 6, further comprising the step of resetting said cumulative adjustment value to zero in response to determining the zero point error was influenced by an object on the vehicle seat.

8. The method of claim 1, wherein said step of determining an unoccupied condition of the vehicle seat comprises sensing at least one of a vehicle door opening and activation of a remote keyless entry system of the vehicle.

9. The method of claim 1, wherein determining whether the zero point error was influenced by an object on the vehicle seat comprises the steps of:
   monitoring a sensed seat weight; and
   determining the zero point error was influenced by an object on the vehicle seat in response to a decrease in the sensed seat weight.

10. The method of claim 1, further comprising the steps of:
    monitoring a sensed seat weight; and validating the zero point error in response to sensing an increase in the sensed seat weight.

11. A method for adjusting the zero point of a vehicle seat weight sensing system, the method comprising the steps of:
   determining a zero point error of the seat weight sensing system;
   adjusting the zero point error in response to determining that the zero point error was influenced by an object on the vehicle seat;
   monitoring a sensed seat weight; and
   invalidating the zero point error in response to sensing a decrease in the sensed seat weight.

12. A method for adjusting the zero point of a vehicle seat weight sensing system, the method comprising the steps of:
   determining an unoccupied condition of the vehicle seat;
   determining a zero point error in response to determining the unoccupied condition;
   determining the zero point error was influenced by an object on the vehicle seat if the zero point error is outside a predetermined range and a cumulative zero point adjustment value is within the predetermined range.

13. A method for adjusting the zero point of a vehicle seat weight sensing system, the method comprising the steps of:
   determining a zero point error of the seat weight sensing system; and
   adjusting the zero point error in response to determining that the zero point error was influenced by an object on the vehicle seat.

14. The method recited in claim 13, wherein the step of determining a zero point error comprises the steps of:
   determining an unoccupied condition of the vehicle seat, comprising determining whether a seatbelt is latched;
   determining a sensed weight on the vehicle seat in response to determining the unoccupied condition; and
   determining the zero point error in response to determining the sensed weight.

15. The method recited in claim 13, wherein said step of determining a sensed weight comprises determining the sensed weight in response to an output of a seat weight sensor associated with the vehicle seat.

16. The method recited in claim 13, further comprising the steps of:
   determining whether the zero point error is within a predetermined range in response to determining that the zero point error was not influenced by an object on the vehicle seat; and
   adjusting the zero point of the seat weight sensing system to help correct the zero point error in response to the zero point error being within the predetermined range.

17. The method recited in claim 13, wherein the step of determining a zero point error comprises the steps of:
   determining an unoccupied condition of the vehicle seat by waiting a predetermined time period after the vehicle ignition is deactivated;
   determining a sensed weight on the vehicle seat in response to determining the unoccupied condition; and
   determining the zero point error in response to determining the sensed weight.

18. The method recited in claim 13, wherein the step of determining a zero point error comprises the step of determining an unoccupied condition of the vehicle seat by determining whether there are any fluctuations in a sensed seat weight for a predetermined time period.

19. The method recited in claim 13, wherein the step of determining whether the zero point error was influenced by an object on the vehicle seat comprises the steps of:
   determining the zero point error is not within a predetermined range;
   determining a cumulative zero point adjustment value as the sum of previous zero point adjustments; and
   determining the zero point error was influenced by an object on the vehicle seat if the cumulative zero point adjustment value is within the predetermined range.

20. The method recited in claim 19, further comprising the step of resetting said cumulative adjustment value to zero in response to determining the zero point error was influenced by an object on the vehicle seat.

21. The method recited in claim 13, wherein the step of determining a zero point error comprises the step of determining an unoccupied condition of the vehicle seat by sensing at least one of a vehicle door opening and activation of a remote keyless entry system of the vehicle.

22. The method recited in claim 13, wherein determining whether the zero point error was influenced by an object on the vehicle seat comprises the steps of:
   monitoring a sensed seat weight; and
   determining the zero point error was influenced by an object on the vehicle seat in response to a decrease in the sensed seat weight.

23. The method recited in claim 13, further comprising the steps of:
   monitoring a sensed seat weight; and
   validating the zero point error in response to sensing an increase in the sensed seat weight.

* * * * *